United States Patent
Muramatsu et al.

(10) Patent No.: US 7,344,128 B2
(45) Date of Patent: Mar. 18, 2008

(54) FLUID-FILLED TYPE VIBRATION-DAMPING DEVICE

(75) Inventors: Atsushi Muramatsu, Komaki (JP);
Hajime Maeno, Kasugai (JP);
Mutsumi Muraoka, Kasugai (JP);
Hironori Koyama, Kasugai (JP);
Satoshi Umemura, Kamo-gun (JP)

(73) Assignee: Tokai Rubber Industries, Ltd., Komaki (JP)

( * ) Notice: Subject to any disclaimer, the term of this patent is extended or adjusted under 35 U.S.C. 154(b) by 22 days.

(21) Appl. No.: 11/370,897

(22) Filed: Mar. 9, 2006

(65) Prior Publication Data
US 2006/0220287 A1 Oct. 5, 2006

(30) Foreign Application Priority Data
Mar. 17, 2005 (JP) .............................. 2005-077975

(51) Int. Cl.
*F16F 13/00* (2006.01)
(52) U.S. Cl. ................................. 267/140.13
(58) Field of Classification Search ........... 267/140.13, 267/219, 140.11
See application file for complete search history.

(56) References Cited
U.S. PATENT DOCUMENTS

| | | | |
|---|---|---|---|
| 4,711,206 A * | 12/1987 | Andra et al. ........... | 267/140.13 |
| 4,742,999 A * | 5/1988 | Flower .................. | 267/140.13 |
| 6,598,865 B1 * | 7/2003 | Kato ..................... | 267/140.13 |
| 6,637,734 B2 * | 10/2003 | Thomazeau et al. ... | 267/140.13 |
| 2002/0171186 A1 * | 11/2002 | Baudendistel et al. . | 267/140.15 |
| 2003/0080483 A1 * | 5/2003 | Umemura et al. ..... | 267/140.13 |
| 2006/0091594 A1 * | 5/2006 | Miyahara .............. | 267/140.13 |

FOREIGN PATENT DOCUMENTS

JP     Y2 04-033478     8/1992

* cited by examiner

*Primary Examiner*—Christopher P. Schwartz
(74) *Attorney, Agent, or Firm*—Oliff & Berridge, PLC

(57) ABSTRACT

A fluid-filled type vibration-damping device having a movable rubber plate housed within a partition member partitioning a pressure-receiving chamber and an equilibrium chamber from each other. The movable rubber plate is moved owing to the pressure difference between the two chambers. The movable rubber plate comprises the movable rubber plate formed of a generally disk shaped rubber elastic body having formed thereon in alternating fashion concave grooves and convex ribs each extending in a circumferential direction about a same center axis, the convex ribs have tapered cross section gradually narrowing in width towards an distal end thereof, and the concave grooves and convex ribs are disposed at the same locations in a diametrical direction on either face of the movable rubber plate so that the thickness of the movable rubber plate is varied in the circumferential direction.

8 Claims, 1 Drawing Sheet

FLUID-FILLED TYPE VIBRATION-DAMPING DEVICE

INCORPORATED BY REFERENCE

The disclosure of Japanese Patent Application No. 2005-077975 filed on Mar. 17, 2005 including the specification, drawings and abstract is incorporated herein by reference in its entirety.

BACKGROUND OF THE INVENTION

1. Field of the Invention

The present invention relates generally to a fluid-filled type vibration-damping device designed to produce vibration damping effect on the basis of flow action of a non-compressible fluid sealed within its interior; and more particularly to a fluid-filled type vibration-damping device having a flexible plate as a fluid pressure absorbing mechanism.

2. Description of the Related Art

Rubber vibration dampers comprising a first mounting member and a second mounting member connected by a main rubber elastic body are widely employed in a variety of fields as vibration-damped connectors or vibration-damped supports installed between components that make up a vibration transmission system. As one type of rubber vibration damper of this kind, there have been proposed fluid-filled type vibration-damping devices that utilize resonance or other flow action of a non-compressible fluid sealed within the device. As one such vibration-damping device, there is known a fluid-filled type vibration-damping device that typically comprises: a first mounting member and a second mounting member attached respectively to a vibration-damped member and a vibrating member and connected together by a main rubber elastic body; a pressure-receiving chamber whose wall is partially constituted by the main rubber elastic body and that gives rise to pressure fluctuations when vibration is input; an equilibrium chamber whose wall is partially constituted by a flexible film and which allows change in volume; a non-compressible fluid sealed within the pressure-receiving chamber and the equilibrium chamber; and an orifice passage interconnecting the two chambers.

Vibration damping effect based on resonance of the non-compressible fluid induced to flow through the orifice passage is achieved only in the specific frequency range to which the device has been pre-tuned. Accordingly, in order to improve vibration damping ability, while avoiding markedly high dynamic spring constant exhibited particularly when vibration of a higher frequency range than the tuning frequency of the orifice passage is input, there has been proposed a fluid pressure absorbing mechanism, which employs a movable plate. The fluid pressure absorbing mechanism is typically constructed by forming a housing space in the partition member that divides the pressure-receiving chamber and the equilibrium chamber, and disposing a movable plate housed within this housing space so as to permit minute displacement thereof. The housing space connects with the pressure-receiving chamber and the equilibrium chamber via through-holes, and pressure in the pressure-receiving chamber is exerted on one face of the movable plate, while pressure in the equilibrium chamber is exerted on the other face.

Displacement of the movable plate based on a pressure differential between the pressure-receiving chamber and the equilibrium chamber enables minute pressure fluctuations produced in the pressure-receiving chamber during input of vibration in the high-frequency range to escape into and be absorbed in the equilibrium chamber. During input of vibration of the low-frequency range to which the orifice passage has been tuned, on the other hand, due to the large amplitude of the vibration, the movable plate is forced into contact against the inside face of the housing space, and in a state of being juxtaposed or superimposed against it substantially blocks off the through-hole. Consequently, absorption of pressure of the pressure-receiving chamber by the fluid pressure absorbing mechanism is avoided, so that the relative pressure fluctuations are produced effectively in the pressure-receiving chamber and the equilibrium chamber, ample fluid flow through the orifice passage between the two chambers is assured, and vibration damping action is produced by the orifice passage.

In this kind of fluid pressure absorbing mechanism, when sharp pressure fluctuations are produced in the pressure-receiving chamber by input of large-amplitude vibration, the movable plate is caused to strike forcefully against the inside wall of the housing space. A resultant problem is that the impact of the movable plate striking against the inside wall of the housing space tends to produce noise and vibration. For example, where employed as an automotive engine mount, noise that is audible to the driver can be produced during engine cranking or when driving over bumps, which poses the risk of contributing to diminished drive feel.

To address such problems, it has been proposed, for example in JP-Y2-4-33478, to fabricate the movable plate from a rubber elastic plate, and to integrally form a small projection of rib form on the surface thereof, whereby the impact of striking can be absorbed by this small projection. However, while such a small projection has been found effective against striking at relatively low energy, in the event of a sudden large pressure fluctuation in the pressure-receiving chamber, adequate effectiveness is not readily achieved, making further improvement desirable.

SUMMARY OF THE INVENTION

It is therefore one object of this invention to provide a fluid-filled type vibration-damping device furnished with a movable plate of novel construction able to consistently and effectively prevent noise from occurring when the movable rubber plate comes into contact with the partition member.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention provide A fluid-filled type vibration-damping device for elastically connecting two components making up a vibration transmission system in a vibration damping fashion, the device comprising: a first mounting member adapted to be attached to one of the two components; a second mounting member adapted to be attached to an other one of the two components; a main rubber elastic body elastically connecting the first and second mounting members; a pressure-receiving chamber whose wall is partially constituted by the main rubber elastic body having a non-compressible fluid sealed therein, and into which vibration is input; an equilibrium chamber having the non-compressible fluid sealed therein, whose wall is partially constituted by a flexible film that readily permits change in volume of the equilibrium chamber; a partition member supported by the second mounting member and positioned such that the pressure-receiving chamber and the auxiliary fluid chamber are disposed on either side thereof; an orifice passage through which the pressure-receiving chamber and the equilibrium chamber communicate with each other; and a movable rubber plate is housed within a housing space provided in the partition member, the housing space formed with through-holes for connecting the housing space to the pressure-receiving chamber and the equilibrium chamber respectively so that the pressure in the pressure-receiving chamber is exerted on a first face of the movable rubber plate while pressure in the equilibrium chamber is exerted on an other face so that small pressure fluctuations produced in the pressure-receiving chamber during vibration input escape to and are absorbed by the equilibrium chamber via the movable rubber plate, wherein the movable rubber plate is formed of a generally disk shaped rubber elastic body, and has at least one concave groove and at least one convex rib formed in alternating fashion on each of the first face and the other face of the movable rubber plate, extending in a circumferential direction about a same center axis, and wherein each of the convex ribs has tapered cross section gradually narrowing in width towards an distal end thereof, and the at least one concave groove and convex rib on the first face and the at least one concave groove and convex rib on the other face are disposed at the same locations in a diametrical direction, respectively, so that the thickness of the movable rubber plate is varied in the circumferential direction.

In the fluid-filled type vibration-damping device constructed in accordance with this mode, the distal end of the convex ribs formed on either side of the movable rubber plate have tapered cross section that gradually narrows in width towards the distal end. Accordingly, in the event that the convex ribs undergo elastic deformation due to pressure resulting from the movable rubber plate contacting the housing space wall during input of large-amplitude vibration, the area of contact between the movable rubber plate and the housing space wall increases gradually. Consequently, it becomes possible to prevent a sharp rise in pressure due to the movable rubber plate striking the housing space inside wall when vibration is input, and to effectively prevent striking noise from occurring due to the sharp rise in pressure.

By forming the convex ribs so as to extend in the circumferential direction, when convex ribs are caused to undergo elastic deformation as the movable rubber plate comes into contact against the housing space inside wall, the convex ribs will be consistently caused to undergo compressive deformation without producing bending or other unwanted deformation, whereby impact absorbing effect may be achieved in a highly reliable manner.

By means of appropriately establishing the slope angle and curvature of the sloping faces and curving faces making up the convex ribs, or the projecting height thereof, it is possible to readily adjust the pressure produced when the partition member and the movable rubber plate come into contact, and to establish, in accordance with the required tuning accuracy, the level of absorption of the energy of contact associated with elastic deformation of the movable rubber plate.

On the front and back faces of the movable rubber plate, the concave grooves are situated at the same locations in the diametrical direction, and the convex ribs are situated at the same locations in the diametrical direction. Consequently, the convex ribs of the movable rubber plate reliably undergo compression and elastic deformation in the axial direction by means of the pressure created when the movable rubber plate strikes against the housing space, thus assuring highly consistent suppressing effect against striking noise.

A second mode of the invention provide a fluid-filled type vibration-damping device according to the first mode, wherein on each of the first and other faces, a plurality of the concave grooves extending in the circumferential direction are formed in a concentric arrangement, and the convex rib is formed diametrically between neighboring concave grooves, so as to extend in the circumferential direction.

In the fluid-filled type vibration-damping device constructed in accordance with this mode, there are formed a plurality of concave grooves, and convex ribs extending in the circumferential direction are formed diametrically between neighboring concave grooves. With this arrangement, bulging deformation of the convex ribs in the diametrical direction of the movable rubber plate is permitted by means of the concave grooves that are located to either side of each convex rib in the diametrical direction of the movable rubber plate. Consequently, compressive deformation in the projection direction of the convex ribs in association with bulging deformation thereof in the diametrical direction of the movable rubber plate is readily permitted, and it is possible to advantageously absorb pressure fluctuations that cause noise of the movable rubber plate striking against the housing space during vibration input.

A third mode of the invention provides a fluid-filled type vibration-damping device according to the first or second mode, wherein each of the convex ribs is formed extending in the circumferential direction with a generally triangular cross section, and a slope angle: $\alpha$ of sloping faces making up side walls of each of the concave grooves is such that $45<\alpha<90°$.

In the fluid-filled type vibration-damping device constructed in accordance with this mode, by imparting triangular shape to the cross section of the convex ribs, contact pressure which can produce noise when coming into contact against the housing space inside wall can be dispersed successfully through elastic deformation, whereby striking noise can be prevented. With the movable rubber plate in a state of initial contact having come into contact against the housing space, the projecting distal ends of the convex ribs come into linear contact against the housing space, and thus the area of contact can be made extremely small, and high impact absorbing action can be achieved during the initial contact period. Additionally, by establishing the slope angle: $a$ of the sloping faces making up the side walls of the concave grooves such that $45°<\alpha<90°$, an adequate angle at the projecting distal end of the convex rib may be assured, whereby bending of the projecting distal end due to pressure at the time of contact can be advantageously prevented, and excellent shock absorbing effect can be consistently achieved.

A fourth mode of the invention provides a fluid-filled type vibration-damping device according to any of the first to third modes, wherein a projecting distal end of each of the convex ribs has a curving face.

In the fluid-filled type vibration-damping device constructed in accordance with this mode, by constituting the projecting distal end of the convex rib as a curving face, it is possible to more advantageously avoid bending deformation of the projecting distal ends of the convex ribs when the movable rubber plate comes into contact with the housing space inside wall, and to consistently prevent the occurrence of noise. Additionally, when the movable rubber plate and the housing space come into contact, the zones of contact of the movable rubber plate with the housing space are linear, and the area of contact is extremely small. Consequently, excellent impact absorbing ability can be realized immediately upon contact.

A fifth mode of the invention provides a fluid-filled type vibration-damping device according to any of the first to fourth modes, wherein each of the concave grooves is formed so as to extend continuously in the circumferential direction with a generally V shaped cross section.

In the fluid-filled type vibration-damping device constructed in accordance with this mode, by forming the concave groove with a generally V shaped cross section extending continuously in the circumferential direction, a sufficient level of elastic deformation of the convex ribs is permitted while assuring adequate rigidity of the movable rubber plate as a whole, making it possible to achieve stable operation.

A sixth mode of the invention provides a fluid-filled type vibration-damping device according to any one of the first to fifth modes, further comprising a positioning member for positioning the movable rubber plate with respect to the partition member such that the movable rubber plate is positioned within the housing space so that at a minimum the through-holes are positioned over the concave groove.

In the fluid-filled type vibration-damping device constructed in accordance with this mode, the movable rubber plate is arranged so that by means of the positioning member, it is positioned within the housing space in such a way that, at a minimum, the through-hole is positioned over the concave groove, whereby in the event that the side walls of the concave groove undergo elastic deformation in association with elastic deformation of the convex rib when vibration is input, the non-compressible fluid located within the concave groove will escape out through-hole and into the pressure-receiving chamber or the equilibrium chamber. Consequently, bulging deformation of the convex ribs in the diametrical direction of the movable rubber plate produced in association with compressive deformation of the convex ribs in the direction of projection can be achieved unhindered by non-compressible fluid sealed within the concave groove, and impact force produced when the movable rubber plate is forced into contact with the housing space can be more advantageously absorbed through elastic deformation of the convex ribs.

A seventh mode of the invention provides a fluid-filled type vibration-damping device according to the sixth mode, wherein the positioning member comprises a mating portion of irregular shape for positioning the movable rubber plate with respect to the partition member that is situated at an approximate diametrical center of the movable rubber plate.

In the fluid-filled type vibration-damping device constructed in accordance with this mode, by constituting the positioning member of a mating portion situated in the diametrical center, it is possible to advantageously assure a gap between the movable rubber plate and the housing space in the diametrical direction, and to permit an adequate level of elastic deformation of the convex rib situated outmost on the movable rubber plate in the diametrical direction thereof, whereby the effect of suppressing striking noise through elastic deformation of the convex ribs can be advantageously achieved. Additionally, since a sufficient gap is assured between the outside peripheral face of the movable rubber plate and the housing space side wall during production, control of the diametrical size of the movable rubber plate can be carried out easily.

An eighth mode of the invention provides a fluid-filled type vibration-damping device according to any of the first to seventh modes wherein the first face of the movable rubber plate is identical in shape to the other face.

In the fluid-filled type vibration-damping device constructed in accordance with this mode, there is no need to distinguish between front and back of the movable rubber plate when assembling the movable rubber plate to the partition member, thereby preventing misassembly during the assembly operation, making for a more efficient assembly operation.

A ninth mode of the invention provides a fluid-filled type vibration-damping device according to any one of the first to eighth modes wherein the through-holes are formed only to a diametrical inner peripheral side from a location of the convex rib formed most outwardly in the diametric direction of the movable rubber plate.

In the fluid-filled type vibration-damping device constructed in accordance with this mode, during input of low-frequency, large-amplitude vibration, all of the through-holes are substantially blocked off by means of the movable rubber plate coming into contact with the housing space inside wall, whereby fluid flow between the pressure-receiving chamber and the equilibrium chamber through the housing space can be blocked off. Consequently, in the event of input of vibration in the low-frequency range to which the orifice passage has been tuned, relative pressure fluctuations of the pressure-receiving chamber and the equilibrium chamber are advantageously assured, and high vibration damping capability can be achieved.

As will be apparent from the preceding description, in the fluid-filled type vibration-damping device constructed in accordance with the invention, the planar area of the portions at which the distal ends of the convex ribs formed on the movable rubber plate are in contact with the partition member expands gradually with an increase in pressure, whereby it is possible to suppress or avoid striking noise due to a sharp rise in contact pressure in association with a sharp increase in the contact area.

Additionally, the concave groove formed between neighboring convex ribs permits bulging deformation of the convex ribs in the diametrical direction, so that compressive deformation in the axial direction is unhindered.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
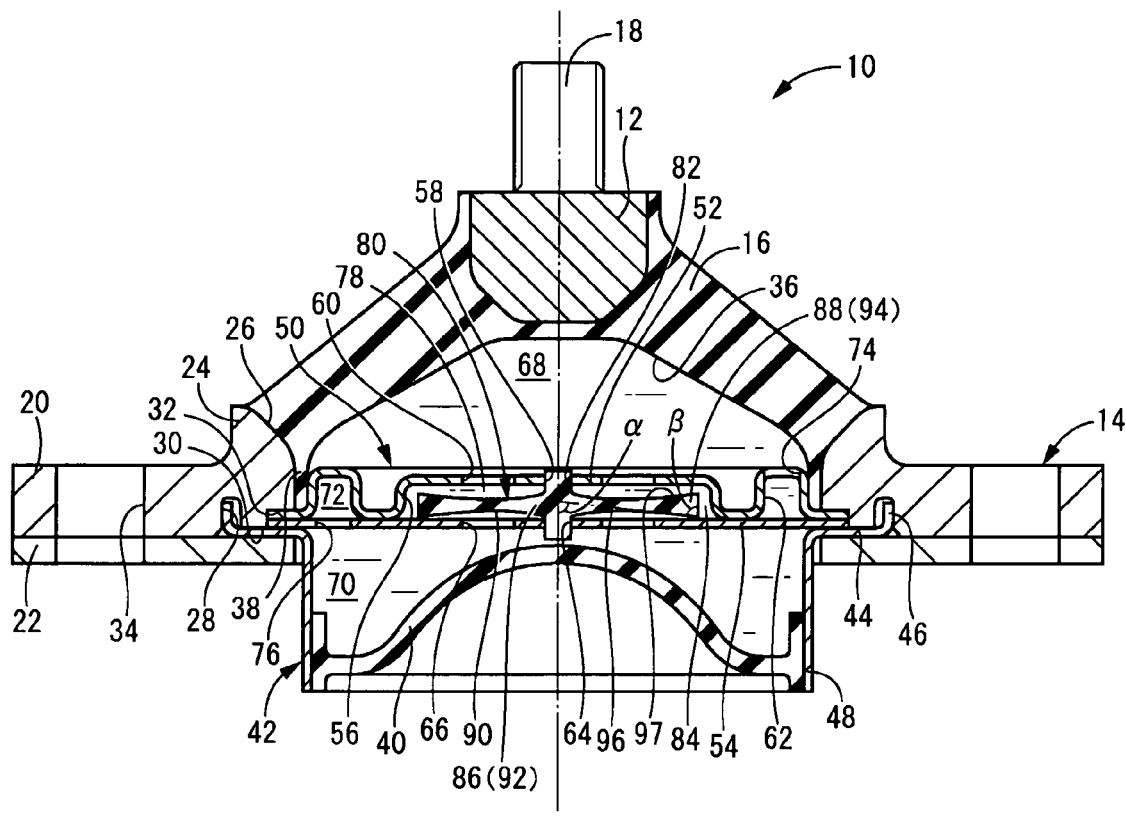
FIG. 1 is an elevational view in axial or vertical cross section of a fluid-filled engine mount in the form of an engine mount of construction according to a first embodiment of the invention.

Referring first to FIG. 1, there is shown an automotive engine mount 10 as a first embodiment of the invention. The engine mount 10 comprises a first mounting member 12 of metal and a second mounting member 14 of metal, and a main rubber elastic body 16 elastically connecting the first and second mounting members 12, 14. The engine mount 10, in cooperation with another engine mount not shown in the drawings, supports the power unit on the body in a vibration damped manner, by means of attaching the first mounting member 12 to the power unit side and the second mounting member 14 to the body side. In the installed state, the engine mount 10, in association with elastic deformation of the main rubber elastic body 16 due to input of the distributed load of the power unit, undergoes relative displacement of the first mounting member 12 and the second mounting member 14 so that these move closer to one another by a prescribed amount in the vertical direction in FIG. 1. The principal vibration to be damped is input across the first mounting member 12 and the second mounting member 14, in the approximately vertical direction in FIG. 1. With the engine mount 10 of this embodiment in the installed state, as depicted in FIG. 1, the center axis of the engine mount 10 (the center axes of the first and second mounting members 12, 14) lies in the approximately vertical direction, and thus in the description hereinbelow the vertical direction in FIG. 1 shall be designated as the vertical direction.

To describe in greater detail, the first mounting member 12 has a generally circular block shape, and an upwardly extending fastener bolt 18 is formed on its center axis. The fastener bolt 18 is threaded into a bolt hole (not shown) formed in a bracket or other such mounting member on the power unit (not shown), thereby attaching the first mounting member 12 to the power unit side.

The second mounting member 14 has a thick, generally annular disk shape overall, and includes an upper mounting member 20 and lower mounting member 22. The upper mounting member 20 is formed of metal of generally annular disk shape overall, and has an elastic body anchoring portion 24 extending axially upward formed on its diametrical inside peripheral edge. The elastic body anchoring portion 24 is of generally annular shape and has a tapered face 26 on an inside peripheral side of its axial upper end forming a gradually sloping face that gradually widens out going upward. On the lower face of the diametrically inside peripheral portion there is formed a press fitting groove 28 extending in the circumferential direction. The lower face located peripherally inward from this press fitting groove 28 is constituted as a fastening fixture support portion 30 situated axially upward by slight extent from the lower face located peripherally outward from the press fitting groove 28. A partition fitting support portion 32 of stepped shape is positioned axially above the fastening fixture support portion 30 by slight extent, on the inside peripheral edge of the upper mounting member 20.

The lower mounting member 22 is thinner than the upper mounting member 20, but the inside diameter dimension and outside diameter dimension thereof are approximately the same as those of the upper mounting member 20. The upper mounting member 20 and the lower mounting member 22 are superimposed top and bottom on the same center axis, to form the second mounting member 14 having thick, generally annular disk shape overall. The diametrically medial portion of the second mounting member 14 is perforated by several bolt holes 34 spaced apart from one another in the circumferential direction. The second mounting member 14 is press-fit into a bracket fitting (not shown), and the bolt holes 34 are fastened to the bracket fitting by means of mounting bolts (not shown) to fasten the second mounting member 14 to the bracket fitting.

The second mounting member 14 is then attached to a tubular bracket fitting (not shown) and the bracket fitting is mounted onto the vehicle body side to fasten it to the vehicle body. The first mounting member 12 is positioned spaced apart above the second mounting member 14 on approximately the same center axis therewith, with the main rubber elastic body 16 disposed between the first mounting member 12 and the second mounting member 14.

The main rubber elastic body 16 has a large-diameter, generally frustoconical shape, and is provided with a large-diameter recess 36 of generally inverted conical shape opening onto its large-diameter end face. With the first mounting member 12 inserted downward in the axial direction from the small-diameter end face of the main rubber elastic body 16, it is bonded by vulcanization to the main rubber elastic body 16 while positioned coaxially therewith. The outside peripheral face of the large-diameter end of the main rubber elastic body 16 is bonded by vulcanization to the tapered face 26 formed in the upper mounting member 20 which makes up the second mounting member 14. That is, the main rubber elastic body 16 is formed as an integrally vulcanization molded component with the first mounting member 12 and the second mounting member 14. With this arrangement, the first mounting member 12 and the second mounting member 14 are positioned approximately coaxially on a center axis extending in the principal direction of input of vibration to be damped, while positioned spaced apart from one another and elastically connected by means of the main rubber elastic body 16. The second mounting member 14 is affixed to the main rubber elastic body 16, whereby the opening at one end of the second mounting member 14 (the upper end in FIG. 1) is sealed off fluid-tightly by the main rubber elastic body 16. A zone on the inside peripheral face of the upper mounting member 20, situated below the inside peripheral edge of the tapered face 26 and above the caulking portion of the partition member 50, is covered in its entirety by a seal rubber layer 38 integrally formed with the main rubber elastic body 16.

At the opening on the other end (the lower end in FIG. 1) of the second mounting member 14, there is attached a diaphragm 40 serving as a flexible film. The diaphragm 40 is constituted by a readily deformable, thin rubber elastic film of generally disk shape imparted with sufficient slack in its center portion. To the outside peripheral edge portion of the diaphragm 40 is bonded by vulcanization a fastener fitting 42 of large-diameter, generally hollow cylindrical shape. The fastener fitting 42 has a step portion 44 disposed in its upper portion. The portion further above the step portion 44 serves as a large-diameter press fitting portion 46, and the portion below the step portion 44 has smaller diameter than the press fitting portion 46 and serves as a film anchoring portion 48 having the diaphragm 40 joined to its inside peripheral wall.

The press fitting portion 46 of the fastener fitting 42 is press-fit into the press fitting groove 28 formed in the lower face of the upper mounting member 20, while the upper face of the step portion 44 of the fastener fitting 42 is superimposed against the fastening fixture support portion 30 formed on the lower face of the upper mounting member 20 and the lower face of the step portion 44 is superimposed against the upper inside peripheral edge of the lower mounting member 22, so as to be sandwiched between the superimposed faces of the upper mounting member 20 and the lower mounting member 22 which are bolted together. By so doing the fastener fitting 42 is fastened to the second mounting member 14, with the lower opening of the second mounting member 14 covered fluid-tightly by the diaphragm 40.

With this arrangement, the zone between the opposed faces of the main rubber elastic body 16 and the diaphragm 40 is sealed off from the outside, and by sealing a non-compressible fluid within this zone, a sealed liquid zone is defined. As the non-compressible fluid sealed within the sealed liquid zone it is possible to use water, an alkylene glycol, a polyalkylene glycol, silicone oil or the like. In terms of effectively achieving vibration damping action on the basis of flow action such as resonance action of the fluid, it is preferable to use a low-viscosity fluid having viscosity of 0.1 Pa·s or lower. Sealing of the non-compressible fluid is accomplished, for example, by performing assembly of the diaphragm 40 to the integrally vulcanization molded component of the main rubber elastic body 16 with the first and second mounting members 12, 14, while immersed in the non-compressible fluid.

The integrally vulcanization molded component of the main rubber elastic body 16 with the first and second mounting members 12, 14 additionally has a partition member 50 attached to the second mounting member 14. The partition member 50 is constituted to include an upper partition fitting 52 and a lower partition fitting 54.

The upper partition fitting 52 has a thin, generally disk shape in plan view. In the center portion of the upper partition fitting 52, by means of pressing or other working process, there is integrally formed a hollow circular convex portion 56 that projects upward in a generally flat circular shape. The upper base portion of this circular convex portion 56 is perforated by a mating hole 58 situated in its diametrical center portion as well as having a number of communication holes 60 consisting of small circular holes bored in the diametrical medial portion. In the outside peripheral portion of the upper partition fitting 52 there is formed an annular convex portion 62 that extends a prescribed distance in the circumferential direction with a groove-shaped cross section that opens downward.

The lower partition fitting 54, on the other hand, has a thin, generally disk shape, and like the upper partition fitting 52 has a mating hole 64 formed in its diametrical center portion, and a number of communication holes 66 consisting of small circular holes bored in its diametrical medial portion. The communication holes 60 and the communication holes 66 make up the through-holes in this embodiment.

The upper partition fitting 52 and the lower partition fitting 54 are superimposed on the same center axis in the axial direction in order to construct the partition member 50. The partition member 50 is positioned with the upper outside peripheral edge portion thereof superimposed against the partition fitting support portion 32 formed on the lower face of the inside peripheral edge of the upper mounting member 20 making up the second mounting member 14 with the lower outside peripheral edge portion thereof superimposed against the fastener fitting 42 affixed to the outside peripheral edge of the diaphragm 40. With this arrangement, the partition member 50 is fixedly supported clasped between the upper mounting member 20 and the lower mounting member 22 via the fastener fitting 42.

With this arrangement, the sealed fluid zone is divided in two top to bottom by means of the partition member 50 disposed extending in the axis-perpendicular direction in the interior thereof. In association with this, there is formed to one side of the partition member 50 in the axial direction (the upper side in FIG. 1) a pressure-receiving chamber 68 a portion of whose wall is constituted by the main rubber elastic body 16 and that gives rise to pressure fluctuations in association with elastic deformation of the main rubber elastic body 16 when vibration is input across the first mounting member 12 and the second mounting member 14. To the other side of the partition member 50 in the axial direction (the lower side in FIG. 1) there is formed an equilibrium chamber 70 a portion of whose wall is constituted by the diaphragm 40 and that readily permits change in volume on the basis of elastic deformation of the diaphragm 40.

The opening on the lower side of the annular convex portion 62 formed in the outside peripheral portion of the upper partition fitting 52 is covered by the outside peripheral portion of the lower partition fitting 54, thereby forming between the opposing faces of the upper partition fitting 52 and the lower partition fitting 54 a fluid flow passage constituting an orifice passage 72.

This fluid flow passage extends a predetermined distance in the circumferential direction, with one end thereof connecting to the pressure-receiving chamber 68 through a pressure-receiving chamber-side communication hole 74 formed perforating the upper mounting member 20, and the other end connecting to the equilibrium chamber 70 through an equilibrium chamber-side communication hole 76 formed perforating the portion of the lower partition fitting 54 that covers the opening of the annular convex portion 62. With this arrangement, the pressure-receiving chamber 68 and the equilibrium chamber 70 communicate with one another by means of the orifice passage 72 which includes the fluid flow passage, thus permitting flow of fluid through the orifice passage 72 between the two chambers 68, 70.

In this embodiment in particular, the resonance frequency of the fluid caused to flow through the orifice passage 72 is tuned so as to produce effective vibration damping performance (high attenuating effect) of vibration in a low frequency range of about 10 Hz corresponding to engine shake and the like, on the basis of resonance action of the fluid. Tuning of the orifice passage 72 can be carried out, for example, by adjusting the passage length and passage cross sectional area of the orifice passage 72. In consideration of the spring rigidity (a characteristic value equivalent to the pressure change required to produce a given change in unit volume) of the walls of the pressure-receiving chamber 68 and the equilibrium chamber 70. Typically, the frequency at which the phase of pressure fluctuations transmitted through the orifice passage 72 changes, producing an approximately resonant state is understood to be the tuning frequency of the orifice passage 72.

The lower opening of the circular convex portion 56 formed in the upper partition fitting 52 is covered by the center portion of the lower partition fitting 54, thereby forming a housing zone 78 as a housing space between the opposing faces of the upper partition fitting 52 and the lower partition fitting 54 at the diametrical center.

An elastic rubber plate 80 serving as the movable rubber plate is disposed in the housing zone 78. The elastic rubber plate 80 has a generally disk shape overall, and on the center axis thereof are formed mating convex portions 82 that project axially upward and downward, respectively. The mating convex portions 82 extend in the axial direction with a circular cross section of outside diameter slightly smaller than the inside diameter of the mating holes 58, 64 respectively formed in the center portions of the upper and lower partition fittings 52, 54; by passing the mating convex portions 82 through these mating holes 58, 64 respectively formed in the upper and lower partition fittings 52, 54, axial displacement of the elastic rubber plate 80 within the housing zone 78 is permitted while limiting the extent of displacement of the elastic rubber plate 80 in the diametrical direction within the housing zone 78. That is, the mating portion in this embodiment is composed of the mating convex portions 82 and the mating holes 58, 64. The elastic rubber plate 80 is formed with a diameter dimension smaller than the diameter dimension of the housing zone 78, thus forming between the opposing elastic rubber plate 80 outside peripheral face and the housing zone 78 side wall inside face a gap which serves as a fluid flow zone 84.

At the diametrical center portion of the elastic rubber plate 80, there are formed center convex portions 86 of generally conical shape projecting axially upward and downward, respectively. At the outside peripheral edge portion of the elastic rubber plate 80, there are formed outside peripheral convex ribs 88 in the form of convex ribs of generally annular shape that project axially upward and downward, respectively. Between these center convex portions 86 and outside peripheral convex ribs 88 in the diametrical direction there are formed medial circumferential grooves 90 serving as concave grooves that extend in the circumferential direction. A center thick portion 92 is formed by the center convex portions 86 and an outside peripheral thick portion 94 is formed by the outside peripheral convex ribs 88, while a medial thin portion 96 is formed by the medial circumferential grooves 90, with these thick and thin portions being situated in alternating fashion across the diameter of the elastic rubber plate 80.

The center convex portions 86 have a generally frustoconical shape gradually narrowing in diameter towards the distal end, and are formed in the center on each face of the elastic rubber plate 80. The projecting height of the center convex portions 86 is established so as to be sufficiently shorter than the projecting height of the mating convex portions 82, with the mating convex portions 82 being formed so as to project axially upward and downward from the diametrical center portion of the center convex portions 86. The projecting height of the center convex portions 86 is established such that the projecting distal ends of the center convex portions 86, 86 respectively formed on the top and bottom of the elastic rubber plate 80 do not come into simultaneous contact with the inside wall of the housing zone 78. That is, the distance between the projecting distal ends of the center convex portions 86, 86 respectively formed on each side of the elastic rubber plate 80 is smaller than the axial dimension of the housing zone 78. Consequently, at any given time the center convex portion 86 formed on at least one face will be positioned away from the inside wall of the housing zone 78.

The outside peripheral convex ribs 88, on the other hand, are formed at the outside peripheral portion the elastic rubber plate 80, and take the form of convex ribs extending in the circumferential direction with a generally triangular cross section. The projecting height of the outside peripheral convex ribs 88 is approximately the same as that of the center convex portions 86, and in the event that the elastic rubber plate 80 undergoes displacement in the axial direction, the center convex portions 86 and the outside peripheral convex ribs 88 will come into approximately simultaneous contact against the inside wall of the housing zone 78.

In this embodiment in particular, the slope angle: a of the sloping face 97 constituting the inside peripheral side wall of the outside peripheral convex rib 88 is set within the range $45° < \alpha < 90°$. The slope angle of the sloping face 97 refers to the angle between center axis of the elastic rubber plate 80 and a line extended from the structural line indicating the sloping face 97 in longitudinal cross section in an arbitrary radial direction, as shown in FIG. 1. In this embodiment, the angle: a between center axis of the elastic rubber plate 80 and a line extended from the structural line indicating the sloping face 97 has an alternate angle or corresponding angle relationship to the angle: $\beta$ of the projecting distal end of the outside peripheral convex ribs 88, with the angle: $\beta$ of the projecting distal end outside peripheral convex ribs 88 being equal to the slope angle: $\alpha$ of the sloping face 97.

Returning now to the medial circumferential grooves 90, these are concave grooves situated diametrically between the center convex portions 86 and the outside peripheral convex ribs 88, and extending in the circumferential direction; in this embodiment in particular, the medial circumferential groove 90 is constituted by a curving face smoothly connecting the side wall of the center convex portion 86 with the insider peripheral side wall of the outside peripheral convex rib 88. As will be understood from the fact that the medial circumferential grooves 90 are formed diametrically between the center convex portions 86 and the outside peripheral convex ribs 88, these are formed respectively on each face of the elastic rubber plate 80, with the medial circumferential grooves 90, 90 on the faces being situated at the same location in the diametrical direction. The communication holes 60, 66 formed respectively in the upper partition fitting 52 and the lower partition fitting 54 are aligned so as to be positioned over the medial circumferential grooves 90.

In the automotive engine mount 10 of construction described above, when shake or other low-frequency, large-amplitude vibration is input, active fluid flow is produced between the pressure-receiving chamber 68 and the equilibrium chamber 70 through the orifice passage 72 which has been pre-tuned to vibration in the low-frequency range, such as shake. When low-frequency, large-amplitude vibration is input, displacement of the elastic rubber plate 80 is unable to follow, and the elastic rubber plate 80 becomes forced against the inside wall of the housing zone 78 thus impeding absorption of fluid pressure through displacement of the elastic rubber plate 80. Additionally, at least one of set of holes from among the communication holes 60, 66 formed respectively in the upper partition fitting 52 and the lower partition fitting 54 become blocked off by elastic rubber plate 80, thereby preventing flow of fluid between the two chambers 68, 70 through the communication holes 60, 66 and the housing zone 78. With this arrangement, pressure fluctuation in the pressure-receiving chamber 68 is advantageously assured, ample flow of fluid induced to flow between the two chambers 68, 70 through the orifice passage 72 is advantageously achieved, and vibration damping action based on resonance of fluid induced to flow through the orifice passage 72 is effectively realized.

Here, striking noise caused by impact force when the elastic rubber plate 80 contacts the inside wall of the housing zone 78 when low-frequency, large-amplitude vibration is input can tend to become a problem. However, with the engine mount 10 constructed in accordance with this embodiment, it is possible to effectively reduce the impact force during contact, and thus to reduce or avoid the occurrence of noise due to impact force during contact.

Specifically, in the event that the elastic rubber plate 80 is induced to undergo displacement in the axial direction and comes into contact with the wall of the housing zone 78, with the elastic rubber plate 80 of the engine mount 10 pertaining to this embodiment, the center convex portions 86 and the outside peripheral convex ribs 88 initially come into contact with the partition member 50 making up the wall of the housing zone 78. In this embodiment in particular, the center convex portions 86 and the outside peripheral convex ribs 88 are formed with approximately identical projecting height so as to come into contact with the partition member 50 approximately simultaneously, while the center convex portions 86 are frustoconical in shape and the outside peripheral convex ribs 88 have generally triangular cross section gradually narrowing in width towards the projecting distal end. Accordingly, immediately upon contact the elastic rubber plate 80 and the partition member 50 are placed in linear contact, so that the impact force of initial contact is effectively dispersed and mitigated.

As the elastic rubber plate 80 is urged further against the partition member 50 by the relative pressure differential between the pressure-receiving chamber 68 and the equilibrium chamber 70, the center convex portion 86 and the distal end of the outside peripheral convex rib 88 are become compressed in the axial direction and undergo elastic deformation so as to collapse. Here, the center convex portion 86 and the outside peripheral convex rib 88 caused to undergo compressive deformation in the axial direction are induced thereby to undergo bulging deformation in the diametrical direction, but since the medial circumferential groove 90 has been formed diametrically between the center convex portion 86 and the outside peripheral convex rib 88, this bulging deformation is permitted, and compressive deformation of the center convex portion 86 and the outside peripheral convex rib 88 in the axial direction is advantageously achieved. By means of this, as pressure acts on the elastic rubber plate 80 forcing it against the partition member 50 with greater force, the center convex portion 86 and the outside peripheral convex rib 88 are induced to undergo gradual elastic deformation, whereby it is possible to prevent a sharp rise in contact pressure, and to reduce or avoid striking noise caused by a sudden pressure fluctuation during contact. The cross sectional area of the medial circumferential groove 90 becomes smaller due to compressive deformation of the center convex portion 86 and the outside peripheral convex rib 88 in the axial direction. However, since the communication holes 60, 66 are formed opening onto the location where the circumferential groove 90 is formed, the non-compressible fluid within the medial circumferential groove 90 escapes into the pressure-receiving chamber 68 or the equilibrium chamber 70 in association with the elastic deformation of the elastic rubber plate 80, so that impaired elastic deformation of the elastic rubber plate 80 due to non-compressible fluid being sealed within the medial circumferential groove 90 can be effectively avoided.

Additionally, the projecting distal end of the center convex portion 86 becomes gradually smaller in diameter, and the width dimension of the outside peripheral convex rib 88 gradually decreases towards its projecting distal end. As these elements undergo gradual elastic deformation in association with increasing pressure acting on the elastic rubber plate 80 due to contact, the contact area of the elastic rubber plate 80 with the partition member 50 increases gradually. Consequently, the occurrence of noise due to a sharp increase in contact force produced by a sudden increase in contact area can be effectively prevented.

The cross sectional area of the outside peripheral convex rib 88 in a reference plane which is a plane that passes through the deepest location of the medial circumferential groove 90 and extends in the axis-perpendicular direction of the elastic rubber plate 80 is established so as to be equivalent to at least 30% but no more than 70% of the cross sectional area of the medial circumferential groove 90 in a reference plane which is a plane that passes through the location of the projecting distal end of the outside peripheral convex rib 88 and extends in the axis-perpendicular direction of the elastic rubber plate 80. In preferred practice, the cross sectional area of the outside peripheral convex rib 88 will be equivalent to at least 40% but no more than 60% of the cross sectional area of the medial circumferential groove 90, and more preferably the cross sectional area of the outside peripheral convex rib 88 will be 50% of the cross sectional area of the medial circumferential groove 90.

If the cross sectional area of the outside peripheral convex rib 88 is too small relative to the cross sectional area of the medial circumferential groove 90, while the initial impact force of contact can be absorbed, as compressive deformation is induced by increasing contact pressure, the outside peripheral convex rib 88 will collapse within a relatively short time so that sufficient cushioning action subsequent to elastic deformation is not achieved. If on the other hand the cross sectional area of the outside peripheral convex rib 88 is too large relative to the cross sectional area of the medial circumferential groove 90, the medial circumferential groove 90 will not be endowed with adequate width and will not accommodate an adequate level of bulging deformation in the diametrical direction in association with compressive deformation of the outside peripheral convex rib 88 in the axial direction, and thus will not readily permit effective compressive deformation, with the risk that impact absorbing effect through elastic deformation in the axial direction will not be sustained at its initial level.

From this viewpoint, it is clear that, in order to achieve both cushioning performance immediately after contact and sustained cushioning performance after the outside peripheral convex rib 88 has been induced to undergo elastic deformation, it is effective for the cross sectional area of the outside peripheral convex rib 88 relative to the cross sectional area of the medial circumferential groove 90 to be established within the range given above, and by so doing to more effectively reduce or avoid the occurrence of noise.

When running booming noise or similar high-frequency, small-amplitude vibration is input to the automotive engine mount 10, the orifice passage 72, which is tuned to a lower frequency range than the input vibration, assumes markedly higher fluid flow resistance due to anti-resonance action, and becomes substantially closed off.

Meanwhile, due to small-amplitude pressure fluctuations produced in the pressure-receiving chamber 68 by input of high-frequency, small-amplitude vibration, the elastic rubber plate 80 is induced to undergo minute displacement in the axial direction within the housing zone 78. By means of this, pressure fluctuations in the pressure-receiving chamber 68 are effectively transmitted to the equilibrium chamber 70, and the pressure fluctuations produced in the pressure-receiving chamber 68 are absorbed by the equilibrium chamber 70 which permits change in volume. Additionally, due to the flow of fluid between the pressure-receiving chamber 68 and the equilibrium chamber 70 through the communication holes 60 formed in the upper partition fitting 52 and the communication holes 66 formed in the lower partition fitting 54, fluid pressure within the pressure-receiving chamber 68 escapes into the equilibrium chamber 70. Thus, a marked rise in dynamic spring constant caused by the orifice passage 72 becoming substantially closed off is avoided, and good vibration damping effect (vibration insulating effect based on low dynamic spring characteristics) against high-frequency, small-amplitude vibration is achieved.

In the engine mount 10 constructed according to this embodiment, impact force produced by the elastic rubber plate 80 coming into contact against the partition member 50 when large-amplitude vibration is input is effectively absorbed through cooperation on the part of the center convex portions 86, the medial circumferential grooves 90, and the outside peripheral convex ribs 88 formed on the elastic rubber plate 80, and the occurrence of noise caused by such impact force can be effectively reduced or avoided.

By forming the outside peripheral convex ribs 88 as convex ribs of annular shape extending in the circumferential direction, it is possible to achieve consistent elastic deformation during contact, and to reliably reduce or avoid noise. Additionally, since the outside peripheral convex ribs 88 are formed extending about the entire circumference at the outermost peripheral edge of the elastic rubber plate 80, when the elastic rubber plate 80 is forced into contact against the partition member 50 during input of large-amplitude vibration, flow of fluid between the pressure-receiving chamber 68 and the equilibrium chamber 70 through the communication holes 60, 66 is immediately obstructed by the outside peripheral convex rib 88, advantageously ensuring that pressure fluctuations are produced within the pressure-receiving chamber 68. Consequently, fluid flow through the orifice passage 72 can be adequately assured, and vibration damping action based on resonance of the fluid can be exhibited effectively.

By positioning the mating convex portions 82 in the center of the elastic rubber plate 80 so that they are engaged by the mating holes 58, 64 formed in the center of the partition member 50, the elastic rubber plate 80 is positioned in the axial direction with respect to the partition member 50. Consequently, the fluid flow zone 84 formed to the outside in the diametrical direction is consistently assured, and during input of small-amplitude vibration, fluid pressure absorbing action is effectively realized by means of permitting fluid flow between the pressure-receiving chamber 68 and the equilibrium chamber 70.

Figure 2:
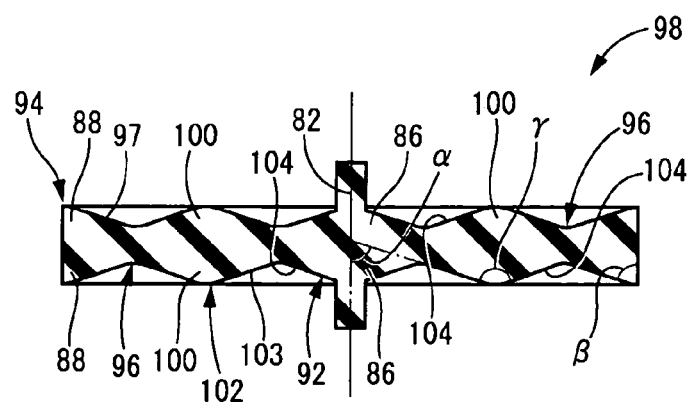
FIG. 2 is an elevational view in axial or vertical cross section of an engine mount of construction according to a second embodiment of the invention.

Turning next to FIG. 2, there is shown an elastic rubber plate 98 in an engine mount according to a second embodiment of the invention. In the following description, components and areas substantially identical to those in the first embodiment described previously are assigned identical symbols in the drawings, and are not described in any detail.

More specifically, the elastic rubber plate 98 is of generally disk shape having medial convex ribs 100 in portions of its diametrically medial section. The medial convex ribs 100 are convex ribs of unchanging, generally triangular cross section extending all the way around in the circumferential direction. By forming a medial convex rib 100 on each side of the elastic rubber plate 98, there is formed a medial thick portion 102. In this embodiment in particular, one medial convex rib 100 is formed on each of the two faces of the elastic rubber plate 98, situated about the same center axis approximately midway in the diametrical direction between the center convex portions 86 and the outside peripheral convex ribs 88. In this embodiment, the medial convex ribs 100 and the outside peripheral convex ribs 88 constitute the convex ribs.

Also, the angle: $\gamma$ of the projecting distal end of the medial convex rib 100 in cross section is an obtuse angle such that $90°<\gamma<180°$, and the narrow zone at the distal end is constituted by a slightly bowing face. The projecting height of the medial convex rib 100 is about the same as the projecting height of the center convex portion 86 and the outside peripheral convex rib 88. The cross sectional area of the medial convex rib 100 is approximately double the cross sectional area of the outside peripheral convex rib 88, and the angle: $\gamma$ of the projecting distal end of the medial convex rib 100 is approximately double the angle: $\beta$ of the projecting distal end of the outside peripheral convex rib 88. Additionally, the slope angle of the sloping face 103 of the medial convex rib 100 is equal to the slope angle of the sloping face 97 of the outside peripheral convex rib 88. The slope angle of the sloping face 103 of the medial convex rib 100 refers to the angle: a between center axis of the elastic rubber plate 98 and a line extended from the sloping face 103 constituting a side wall of the medial convex rib 100, in longitudinal cross section in an arbitrary radial direction. That is, in this embodiment, the angle: a between center axis of the elastic rubber plate 80 and a line extended from the structural line indicating the sloping face 97 is one-half the size of the angle: $\gamma$ of the projecting distal end of the outside peripheral convex rib 88.

On each face of the elastic rubber plate 98 in this embodiment are formed a total of two medial circumferential grooves 104, 104, i.e. one between the center convex portion 86 and the medial convex rib 100, and one between the medial convex rib 100 and the outside peripheral convex rib 88. The medial circumferential grooves 104, 104 take the form of concave grooves of generally rectangular cross section, with slightly bowing faces at their deepest part.

The cross sectional area of the medial convex rib 100 in a reference plane which is a plane passing through the deepest location of the medial circumferential groove 104 and extending in the axis-perpendicular direction of the elastic rubber plate 98 is established so as to be equivalent to at least 60% but no more than 140% of the cross sectional area of the medial circumferential groove 104 in a reference plane which is a plane that passes through the location of the projecting distal end of the medial convex rib 100 and extends in the axis-perpendicular direction of the elastic rubber plate 98. In preferred practice, the cross sectional area of the medial convex rib 100 will be equivalent to at least 80% but no more than 120% of the cross sectional area of the medial circumferential groove 104, and more preferably the cross sectional area of the medial convex rib 100 will be 100% of the cross sectional area of the medial circumferential groove 104.

Specifically, if the cross sectional area of the medial convex rib 100 is too small relative to the cross sectional area of the medial circumferential groove 104, while the initial impact force of contact can be absorbed, as compressive deformation is induced by increasing contact pressure, the medial convex rib 100 will collapse within a relatively short time so that sufficient cushioning action subsequent to elastic deformation is not achieved. If on the other hand the cross sectional area of the medial convex rib 100 is too large relative to the cross sectional area of the medial circumferential groove 104, the medial circumferential groove 104 will not be endowed with adequate width and will not accommodate an adequate level of bulging deformation in the diametrical direction in association with compressive deformation of the medial convex rib 100 in the axial direction, and thus will not readily permit effective compressive deformation, with the risk that impact absorbing effect through elastic deformation in the axial direction will not be sustained at its initial level.

This clearly shows that in order to achieve both cushioning performance immediately after contact and sustained cushioning performance after the medial convex rib 100 has been induced to undergo elastic deformation, it is effective for the cross sectional area of the medial convex rib 100 relative to the cross sectional area of the medial circumferential groove 104 to be established within the range given above, and by so doing to more effectively reduce or avoid the occurrence of noise.

By means of the above, the elastic rubber plate 98 in this embodiment is composed, in order from the diametrical center, of center convex portions 86, first medial circumferential grooves 104, medial convex ribs 100, second medial circumferential grooves 104, and outside peripheral convex ribs 88, disposed concentrically about the same axis, with the convex ribs in this embodiment being constituted by the medial convex ribs 100 and the outside peripheral convex ribs 88, and with the concave grooves being constituted by the medial circumferential grooves 104, 104.

The elastic rubber plate 98 described above may be installed in the housing zone 78 in place of the elastic rubber plate 80 described in the preceding first embodiment.

In the engine mount furnished with the elastic rubber plate 98 of this embodiment, by means of forming medial convex ribs 100, contact pressure can be dispersed more advantageously, and cushioning action achieved more effectively. Consequently, sharp rise in pressure which can cause striking noise can be more effectively suppressed, so that the occurrence of noise can be suppressed.

By imparting an obtuse angle to the projecting distal end of the medial convex rib 100, it is possible to advantageously prevent the projecting distal end from undergoing bending deformation due to pressure during contact, and to reliably achieve a gentle increase in pressure by causing it to undergo gradual collapse, and thus to effectively prevent the occurrence of noise due to a sharp rise in pressure. Additionally, by imparting curving faces to the projecting distal ends of the medial convex ribs 100 and the outside peripheral convex ribs 88, it is possible to more effectively prevent bending deformation immediately after contact, so as to avoid a sudden change in pressure, and so as to more effectively reduce or avoid the occurrence of noise.

While the present invention has been described in detail in its presently preferred embodiments, for illustrative purpose only, it is to be understood that the invention is by no means limited to the details of the illustrated embodiment, but may be otherwise embodied. It is also to be understood that the present invention may be embodied with various changes, modifications and improvements which may occur to those skilled in the art, without departing from the spirit and scope of the invention.

For instance, the cross sectional shape of the elastic rubber plates 80, 98 in the illustrated first and second embodiments are just preferred example, and the principle of the present invention is not limited to the illustrated embodiments. More specifically, it is possible to employ two or more medial convex ribs 100 so as to disperse contact pressure, making it possible to further enhance impact noise suppression effect. For the same reason, the medial convex rib 100, the outside peripheral convex ribs 88, the medial circumferential grooves 90, 104 may be suitably adjusted in their shape. More specifically, the medial convex rib 100 may have a cross sectional shape of generally semi-elliptical shape or trapezoid shape.

While the mating convex portions 82 are formed at the diametrically medial portion of the elastic rubber plates 80, 98 in the illustrated first and second embodiments, the mating convex portions 82 are not essential to practice the present invention. Likewise, the mating holes 58, 64 formed through the upper and lower partition fittings 52, 54 are not essential.

In the illustrated first embodiment, the partition member 50 is formed of metal, but it may be formed of rigid resin material, if appropriate.

The shape, size, structure, position, numbers of the orifice passage 72 may be suitably changed depending upon required damping performance or fabrication utility.

It is also to be understood that the present invention may be embodied with various other changes, modifications and improvements, which may occur to those skilled in the art, without departing from the spirit and scope of the invention defined in the following claims.

What is claimed is:

1. A fluid-filled type vibration-damping device for elastically connecting two components making up a vibration transmission system in a vibration damping fashion, the device comprising:
   a first mounting member adapted to be attached to one of the two components;
   a second mounting member adapted to be attached to an other one of the two components;
   a main rubber elastic body elastically connecting the first and second mounting members;
   a pressure-receiving chamber whose wall is partially constituted by the main rubber elastic body having a non-compressible fluid sealed therein, and into which vibration is input;
   an equilibrium chamber having the non-compressible fluid sealed therein, whose wall is partially constituted by a flexible film that readily permits change in volume of the equilibrium chamber;
   a partition member supported by the second mounting member and positioned such that the pressure-receiving chamber and the auxiliary fluid chamber are disposed on either side thereof;
   an orifice passage through which the pressure-receiving chamber and the equilibrium chamber communicate with each other; and
   a movable rubber plate is housed within a housing space provided in the partition member, the housing space formed with through-holes for connecting the housing space to the pressure-receiving chamber and the equilibrium chamber respectively so that the pressure in the pressure-receiving chamber is exerted on a first face of the movable rubber plate while pressure in the equilibrium chamber is exerted on an other face so that small pressure fluctuations produced in the pressure-receiving chamber during vibration input escape to and are absorbed by the equilibrium chamber via the movable rubber plate,
   wherein the movable rubber plate is formed of a generally disk shaped rubber elastic body, and has at least one concave groove and at least one convex rib formed in alternating fashion on each of the first face and the other face of the movable rubber plate, extending in a circumferential direction about a same center axis,
   wherein the at least one convex rib has tapered cross section gradually narrowing in width towards an distal end thereof, and the at least one concave groove and convex rib on the first face and the at least one concave groove and convex rib on the other face are disposed at the same locations in a diametrical direction, respectively, so that the thickness of the movable rubber plate is varied in the circumferential direction,
   wherein the at least one convex rib is formed extending in the circumferential direction with a generally triangular cross section and a slope angle: $\alpha$ of sloping faces making up side walls of the concave groove is such that $45 < \alpha < 90°$, and wherein the at least one concave grooves is formed so as to extend continuously in the circumferential direction with a generally V shaped cross section.

2. A fluid-filled type vibration-damping device according to claim 1, further comprising a positioning member for positioning the movable rubber plate with respect to the partition member such that the movable rubber plate is positioned within the housing space so that at a minimum the through-holes are positioned over the concave grooves, respectively.

3. A fluid-filled type vibration-damping device according to claim 2, wherein the positioning member comprises a mating portion of irregular shape for positioning the movable rubber plate with respect to the partition member that is situated at an approximate diametrical center of the movable rubber plate.

4. A fluid-filled type vibration-damping device according to claim 1, wherein a projecting distal end of the convex rib has a curving face.

5. A fluid-filled type vibration-damping device according to claim 1, wherein on each of the first and other faces, a plurality of the concave grooves extending in the circumferential direction are formed in a concentric arrangement, and the convex rib is formed diametrically between neighboring concave grooves, so as to extend in the circumferential direction.

6. A fluid-filled type vibration-damping device according to claim 1, wherein the first face of the movable rubber plate is identical in shape to the other face.

7. A fluid-filled type vibration-damping device according to claim 1, wherein the through-holes are formed only to a diametrical inner peripheral side from a location of the convex rib formed most outwardly in the diametric direction of the movable rubber plate.

8. A fluid-filled type vibration-damping device according to claim 1, wherein on each of the first and other faces, a plurality of the concave grooves extending in the circumferential direction are formed in a concentric arrangement, and the at least one convex rib comprises a medial convex rib formed diametrically between neighboring concave grooves and extending in the circumferential direction as well as an outside peripheral convex rib disposed diametrically outside an outer most one of the concave grooves and extending in the circumferential direction, and wherein an angle: $\gamma$ of a projecting distal end of the medial convex rib is approximately double an angle: $\beta$ of a projecting distal end of the outside peripheral convex rib.

* * * * *